Dec. 9, 1924. 1,518,663
G. D. MARTIN
CIGAR HOLDER
Filed Feb. 1, 1924
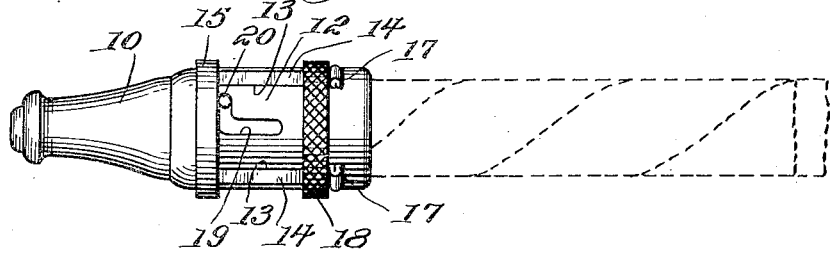
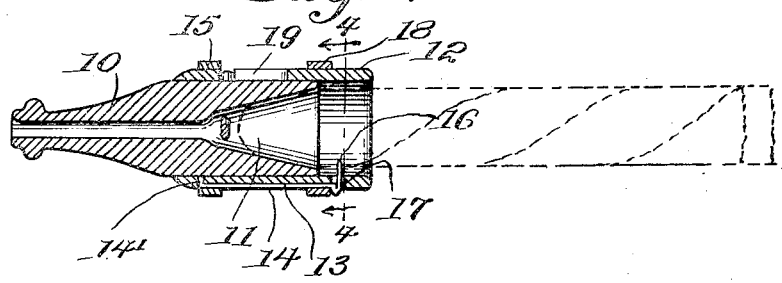
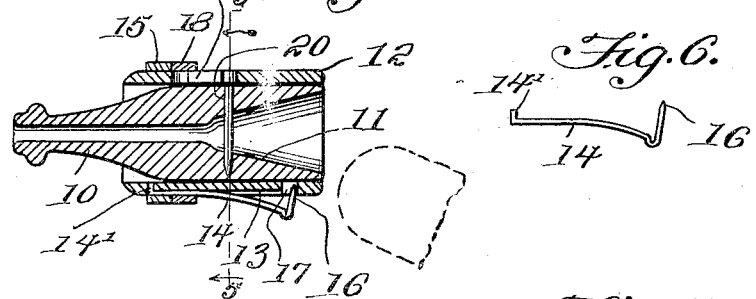
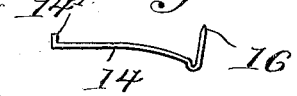
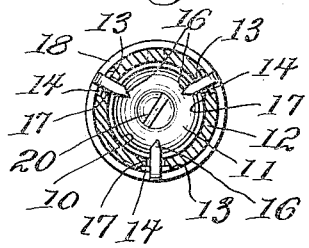
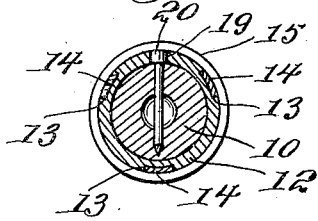
Inventor
George D. Martin
By Victor J. Evans
Attorney
Witness
J. L. Wright
P. C. Gannon Patented Dec. 9, 1924.

1,518,663

UNITED STATES PATENT OFFICE.

GEORGE D. MARTIN, OF MIDDLEPORT, NEW YORK.

CIGAR HOLDER.

Application filed February 1, 1924. Serial No. 689,987.

*To all whom it may concern:*

Be it known that I, GEORGE D. MARTIN, a citizen of the United States, residing at Middleport, in the county of Niagara and State of New York, have invented new and useful Improvements in Cigar Holders, of which the following is a specification.

This invention relates to cigar holders and has for an object the provision of a holder which is capable of use with cigars of different shapes and sizes.

Another object of the invention is the provision of means whereby a cigar may be easily and quickly secured within the holder or released therefrom, together with novel means whereby the cigar may be quickly and effectually removed or ejected from the holder.

With the above and other objects in view, the invention further includes the following novel features and details of construction, to be hereinafter more fully described, illustrated in the accompanying drawings and pointed out in the appended claims.

In the drawings:—

Figure 1 is a plan view of a cigar holder constructed in accordance with the invention, a cigar being indicated by dotted lines.

Figure 2 is a longitudinal sectional view of the same.

Figure 3 is a view similar to Figure 2 but showing a different shape of cigar with the holder in ejecting position.

Figure 4 is a transverse sectional view on the line 4—4 of Figure 2.

Figure 5 is a similar view on the line 5—5 of Figure 3.

Figure 6 is a detail view of one of the spring arms.

Referring in detail to the drawings wherein like characters of reference denote corresponding parts, the holder as shown comprises a mouth piece 10, at one end of which there is provided a socket 11, the shape of the socket being such as to receive and hold a comparatively large blunt cigar as shown in Figure 2 of the drawings, or a smaller cigar of the perfecto shape as shown in Figure 3.

Mounted upon the mouth piece 10 is a sleeve 12, the said sleeve being provided with spaced longitudinally arranged recesses 13 which receive spring arms 14. The inner ends of these arms are located beneath and connected to an annulus 15 which is secured around the inner end of the sleeve and their extremities are bent to enter openings provided in the holder as shown at 14′, while the outer or free ends of the arms 14 are provided with penetrating points 16 which pass through openings 17 provided in the sleeve. The sleeve normally extends beyond the end of the mouth piece and the penetrating points pass through the sleeve between the outer end thereof and the adjacent end of the mouth piece. Mounted upon the sleeve 12 is a ring or annulus 18 which engages over the spring arms 14 and acts to force the penetrating points through the openings so that the said points will engage a cigar as shown in Figures 2 and 3 of the drawings. By moving the ring or annulus 18 inward, the cigar will be released through the action of the spring arms.

The sleeve 12 is provided with a substantially L-shaped or bayonet slot 19 and carried by the mouth piece and extending into this slot is a pin 20, so that this pin serves to secure the sleeve upon the mouth piece in a manner to permit of relative rotary and longitudinal movement.

When it is desired to release the cigar, the ring or annulus 18 is moved inward and the said mouth piece and sleeve are rotated relatively until the pin 20 enters the longitudinally disposed portion of the slot 19, whereupon the mouth piece and sleeve may be moved longitudinally with respect to one another so that the cigar will be forced out of the holder.

The invention is susceptible of various changes in its form, proportions and minor details of construction and the right is herein reserved to make such changes as properly fall within the scope of the appended claims.

Having described the invention what is claimed is:—

1. In a cigar holder, a mouth piece having a cigar receiving socket in one end thereof, a sleeve mounted upon and surrounding the mouth piece, a plurality of longitudinally disposed recesses in said sleeve, spring arms located within the recesses, an annulus secured around the inner end of the sleeve and attached to the inner ends of the arms, said sleeve having openings therein at the outer ends of the recesses, penetrating points at the free ends of the spring arms and extending through the openings and a ring surrounding the sleeve and slidable over the spring arms.

2. In a cigar holder, a mouth piece having a cigar receiving socket in one end thereof, a sleeve mounted upon and surrounding the mouth piece, a plurality of longitudinally disposed recesses in said sleeve, spring arms located within the recesses, an annulus secured around the inner end of the sleeve and attached to the inner ends of the arms, said sleeve having openings therein at the outer ends of the recesses, penetrating points at the free ends of the spring arms and extending through the openings and a ring surrounding the sleeve and slidable over the spring arms and means whereby the sleeve may be attached to the mouth piece to permit of relative rotary longitudinal movement.

3. In a cigar holder, a mouth piece having a cigar receiving socket in one end thereof, a sleeve mounted upon and surrounding the mouth piece, a plurality of longitudinally disposed recesses in said sleeve, spring arms located within the recesses, an annulus secured around the inner end of the sleeve and attached to the inner ends of the arms, said sleeve having openings therein at the outer ends of the recesses, penetrating points at the free ends of the spring arms and extending through the openings, a ring surrounding the sleeve and slidable over the spring arms and a pin and bayonet slot connection between the sleeve and mouth piece.

In testimony whereof I affix my signature.

GEORGE D. MARTIN.